UNITED STATES PATENT OFFICE.

ADOLF BAEYER, OF MUNICH, BAVARIA, GERMANY.

MANUFACTURE OF ARTIFICIAL INDIGO-BLUE.

SPECIFICATION forming part of Letters Patent No. 228,300, dated June 1, 1880.

Application filed April 20, 1880. (Specimens.)

*To all whom it may concern:*

Be it known that I, ADOLF BAEYER, a citizen of Bavaria, Germany, residing at Munich, in the Kingdom of Bavaria and German Empire, have invented a new and useful Improvement in the Manufacture of Artificial Indigo, of which the following is a specification.

This invention relates to the synthetical formation of indigo-blue and allied coloring-matters, which I shall designate hereinafter with the general name of "artificial indigo;" and my invention consists in the formation of artificial indigo-blue within or upon a textile fiber, yarn, or cloth.

The coloring-matters belonging to the chemical group of which indigo-blue may be considered the chief representative are principally characterized by their peculiar molecular arrangement, which may be defined as being built up by the union of a molecule of benzine, an atom of nitrogen, and a side chain containing two atoms of carbon, both the side chain and the nitrogen being fixed in the benzine residue and relatively to each other in the ortho position.

Now, the essential feature of my invention consists in the discovery that the said molecular arrangement may be arrived at by the mutual action of both the side chain and the nitro group in certain derivatives of orthonitrocinnamic acid. The said derivatives are, principally, orthonitrophenyloxyacrylic acid and orthonitrophenylpropiolic acid. The former is converted into indigo-blue by the mere action of heat. The latter requires for that purpose the action of alkalies and deoxidizing agents.

Considering that the principle of my invention consists in the synthetical construction of the above-defined molecular arrangement of artificial indigo, it is evidently of secondary importance whether and to what extent the benzine residue may have its hydrogen substituted by other elements or atomic groups. In the event of such substitution taking place in the benzine residue, theory merely allows to predict the formation of coloring-matters allied to indigo-blue and sharing its general character and chemical proportion.

I now proceed to describe in what manner my invention may be carried into effect: I take orthonitrophenylpropiolic acid, or any mixture or compound containing the same, and mix it with suitable deoxidizing agents—such, for example, as glucose or milk sugar—and with a solution of caustic or carbonated alkalies or of alkaline earths. The said mixture, upon being gradually heated to a temperature of about 100° centigrade, quickly assumes a blue color, which gradually increases in intensity, owing to the formation of indigo-blue in its crystallized condition. The operation is at an end if a filtered portion of the mixture no longer yields any indigo-blue upon the application of heat and upon the addition of a further supply of the deoxidizing agent.

I may also remark that the same reactions take place by employing orthonitrophenylpropiolic acid not only ready formed, but likewise in its nascent state. Any mixture, therefore, capable of producing orthonitrophenylpropriolic acid may be used for the preparation of artificial indigo by submitting it to the action of alkaline substances and deoxidizing agents, substantially in the manner above described. For example, artificial indigo may be produced in one operation and without separation of the intermediate products by submitting, in the manner usually practiced by chemists in analogous operations, orthonitrodibromohydrocinnamic acid first to the action of alcoholic potash and then to the deoxidizing action of glucose. And I may further remark that the synthetical formation of artificial indigo-blue may be effected irrespective of the medium or place wherever the said deoxidizing action can be brought to bear upon orthonitrophenylpropiolic acid, or upon the substances capable of producing the same. For example, artifical indigo-blue may be developed in the interior of or upon textile fibers, yarns, or fabrics first impregnated with a solution of the above-described mixture of orthonitrophenylpropiolic acid, glucose, and alkaline substances, and afterward submitted to the action of dry heat or of steam, and after the artificial indigo-blue has been formed the textile, woven, or knitted material is exposed to a washing process, whereby the superfluous chemical matters are removed.

I do not claim, broadly, in this application for a patent the production of artificial indigo, such forming the subject-matter of a separate application for a patent.

What I claim is—

1. The within-described process for developing artificial indigo-blue in or upon a textile fiber, yarn, or cloth, whether knit or woven, by impregnating said fiber, yarn, or cloth with a solution of a mixture of orthonitrophenylpropiolic acid, an alkali, and a deoxidizing agent, such as glucose, and then submitting the fiber, yarn, or cloth to heat, substantially as set forth.

2. As a new article of manufacture, textile fiber, yarn, or cloth, whether knit or woven, having the herein-described artificial indigo-blue developed within and upon the same by impregnating the same with a solution of a mixture of orthonitrophenylpropiolic acid, an alkali, and a deoxidizing agent, such as glucose, and then submitting the fiber, yarn, or cloth to heat, as set forth, or by any other method that will produce the same result.

In testimony that I claim the foregoing I have hereunto set my hand and seal this 24th day of March, 1880.

ADOLF BAEYER. [L. S.]

Witnesses:
  GUSTAV SIEGLE,
  HEINRICH CARO.